Inventor
R. MURAKAMI - M. KISHIGAMI
By Walter J. Baum
Attorney

Inventor
R. MURAKAMI
M. KISHIGAMI
By Walter Baum
Attorney

Inventor
R. MURAKAMI -
M. KISHIGAMI
By Walter J. Baum
Attorney

United States Patent Office 3,430,144

Patented Feb. 25, 1969

3,430,144

FAULT ALARM SYSTEM FOR TWO-WAY PULSE COMMUNICATION SYSTEMS

Ryuichi Murakami and Minoru Kishigami, Tokyo, Japan, assignors to Nippon Electric Company, Limited, Tokyo, Japan, a corporation of Japan Filed Oct. 21, 1965, Ser. No. 500,014

Claims priority, application Japan, Oct. 24, 1964, 39/60,379

U.S. Cl. 325—41 7 Claims

Int. Cl. H04b 7/00

ABSTRACT OF THE DISCLOSURE

An economical fault detection system for a two-way pulse communication system in which frame synchronism is maintained between the transmitter side and the receiver side by a framing-pulse train composed of framing pulses whose states alternatingly vary between a first and a second pulse state at a predetermined time interval. The system produces an alarm in each terminal station when a fault has occurred in one of the transmission lines and will disrupt synchronism between the stations through the undamaged transmission line. The transmission line containing the fault is identified by the alarm signal.

This invention relates to a fault alarm system for a two-way pulse communication system, such as a pulse-code-modulation (PCM) communication system in which frame synchronism is maintained between the transmitter and the receiver by a framing-pulse train composed of framing pulses which vary between a first and a second pulse state alternating at a predetermined time interval, such as a frame period.

The two-way communication system to which this invention is directed has a pair of cables (or other transmission lines, particularly of the type containing repeaters) operatively connected between a transmitter contained in a first terminal station and a receiver contained in a second terminal station, and a transmitter contained in the second terminal station and a receiver contained in the first terminal station. In these comunication systems, it has been the practice to have a fault which is detected at any point within a path including a transmitter, a line, repeaters, and the receiver contained in the path operate an alarm device on the receiver side of the path for example, at a first terminal station. This receiver alarm device then sends a signal through the other transmission line which operated another alarm device acompanying the receiver at the second terminal station. In this connection, it should be noted that the detected fault is not a fault of the entire two-way communication system. The fault occurred only in that transmission line in which the fault was actually detected and which is no longer capable of sending signals. In other words in the prior art, the other transmission line has been kept in a condition which is capable of transmitting signals. Inasmuch as this condition can cause various difficulties, it was necessary when a fault appeared in one of the transmission lines, to lock the other transmission line to disable transmission therethrough. Furthermore, in these communication systems, it is desirable to speed up the recovery work for the fault. Thus, when an alarm signal is present on the alarm device contained in the first terminal station, it is possible to discriminate whether the alarm signal was produced by a fault which occurred in the transmission line starting at the second participant station and arriving at the first station or vice versa.

According to this invention, in a two-way pulse communication system in which frame synchronism is maintained between the transmitter side and the receiver side by a framing-pulse train composed of framing pulses which alternatingly assume a first and a second pulse state such as "on" and "off" states, it is possible at a frame period or other predetermined time interval, to have a detected fault which occurred in a transmission line starting at the transmitter of the second, participant station and arriving at the receiver of the second station, forcibly put the operation of the frame synchronizing device in the second participant station into disorder by transmitting the alarm signal appearing at the first station to the second participant station through the properly functioning transmission line. Moreover, according to this invention, it is possible to have a discriminator to discriminate whether an alarm signal appearing at an alarm device of one of the stations is due to a fault which occurred in the transmission line starting at the other participant station or in the other transmission line starting at the station having the discriminator.

An object of this invention is therefore to provide an economical fault detection system for a two-way pulse communication system in which frame synchronism is maintained between the transmitter side and the receiver side by a framing-pulse train composed of framing pulses whose states alternatingly vary between a first and a second pulse state at a predetermined time interval, such as a frame period.

It is another object of this invention to provide a fault detection system which not only produces an alarm signal in each pair of participating terminal stations, when a fault has occurred in one of the transmission lines connecting said stations, but also to forcibly disrupt the synchronism between said stations through the other, undamaged, transmission line, said alarm system also discriminating which of the two-way transmission lines has the fault which produced the alarm signals in said terminal stations.

With this invention, a fault which occurred in a first transmission line (starting at a first terminal station and arriving at a second terminal station) is not only used to activate the alarm device of the second terminal station but also to shift the phase of the framing-pulse train being sent out from the second terminal station to the first terminal station by 180°. The thus-shifted framing-pulse train, or the phase-inverted framing-pulse train, is sent from the second terminal station to the first terminal station through the untroubled transmission line. At the first terminal station, either the received framing-pulse train or the received phase-inverted framing-pulse train is compared with a frame-synchronism-discriminating-pulse train (which is provided with the same pattern as the framing-pulse train and which is produced at this terminal station) in a known manner for maintaining the frame synchronism in a manner known in the art. If the result of this comparison indicates the arrival of the phase-inverted framing-pulse train, the comparing means produces, not the usual first type of error-pulse train to see whether the error-pulse train, if present, is of the but rather a second type of error-pulse train whose pattern is different from that of the usual first type error-pulse train. The output of the comparing means is monitored for a predetermined monitoring-time interval to see whether the error-pulse train, if present, is of the first usual type or the second type. If the latter pulse train is present, an alarm is produced on an alarm device other than the alarm device which is operated when a fault is present on the second transmission line. Meanwhile, arrival of the phase-inverted framing-pulse train forcibly disrupts the frame synchronism for the terminal station.

Using this invention, will permit a remarkable simplification of circuitry while producing substantially better results. Circuitry simplification is achieved by using as the monitoring-time interval, the holding-time interval, which is already present in the ordinary pulse communication system (of the type being considered) in order to withhold production of the shifted pulse train so that the hunting or the frame-synchronism-restoration operation will thereafter be initiated if frame synchronism has truly been disrupted. Hunting must never be initiated (to thereby prevent frame synchronism from being disrupted) when frame synchronism is in fact in order and the errors are found to be in the framing-pulse train received at a terminal station or are introduced by code errors arising from some other trouble in the transmission line.

The above-mentioned and other features and objects of this invention and the means for attaining them will become more apparent and the invention itself will be best understood by reference to the following description of embodiments of the invention taken in conjunction with the accompanying drawings in which.

Figure 1:
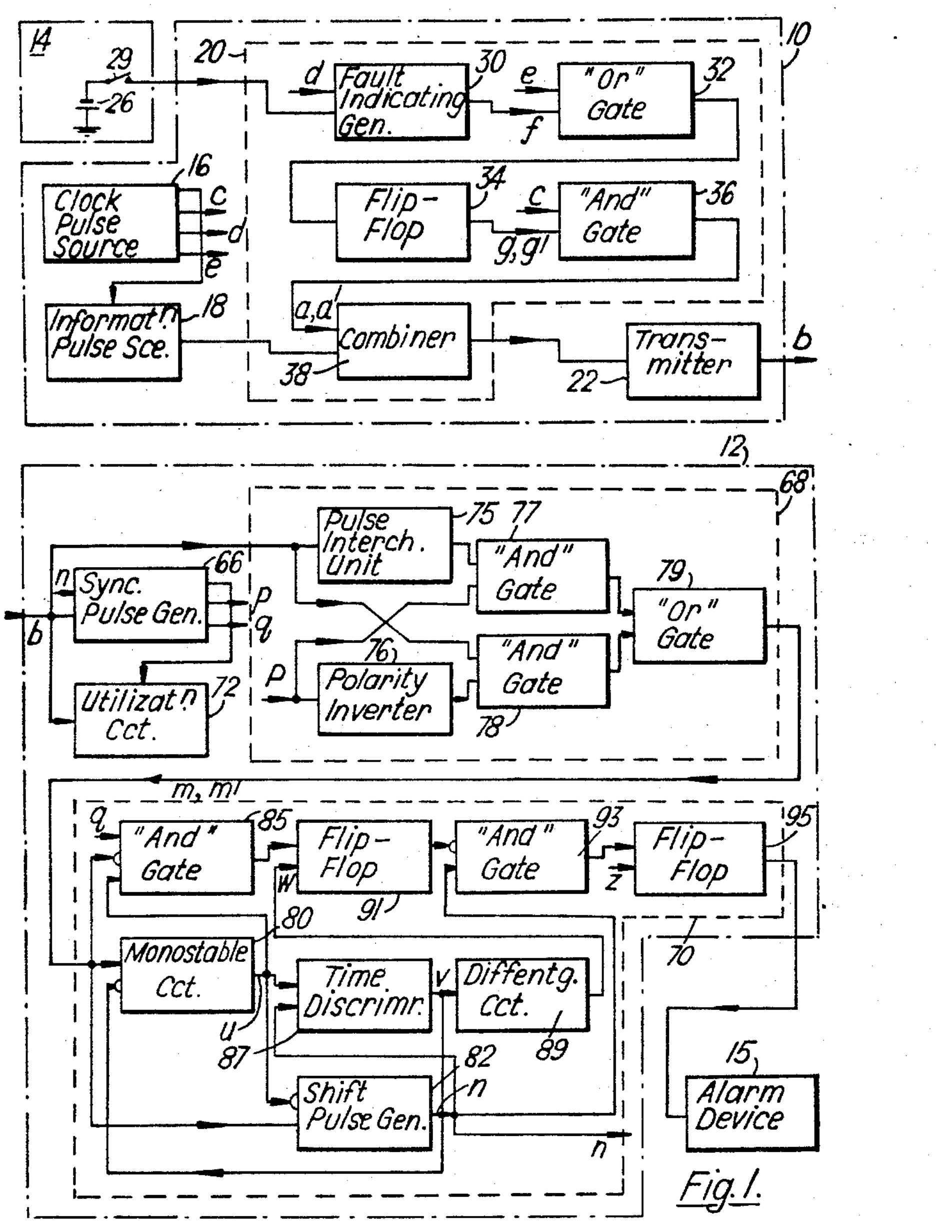
FIG. 1 is a block diagram of a terminal station in which this invention is incorporated.

Referring to FIG. 1, a terminal station of an embodiment of this invention includes a transmitter portion 10 and a receiver portion 12. A first alarm device 14 (which is illustrated for convenience separately from the transmitter 10 and the receiver 12) is provided along with a second alarm device 15 which is operated by the alarm signals from the first alarm device of the participant station (not shown).

The transmitter 10 includes a clock-pulse source 16 which produces, in a known manner, a transmitter-clock-pulse train and other various pulse trains for controlling the operation of the transmitter 10. A conventional information-pulse source 18 is provided for encoding information signals under the control of the transmitter-clock-pulse train, (originating at a signal source, not shown, such as a telephone switchboard), into an information-pulse train which has no pulses at the time positions where the pulses of a framing-pulse train *a* are to be inserted. A framing-pulse phase-control and inserting circuit 20 is provided for (under control of various pulse trains supplied from the clock-pulse source 16 and of the alarm signal supplied from the first alarm device 14), inserting pulses of the framing-pulse train *a* into the information-pulse train supplied thereto from the information pulse, when there is no alarm signal. Circuit 20 inserts the pulses of a phase-inverted framing pulse train *a'* having an inverted phase (compared with the framing-pulse train *a*) into the information pulse train when an alarm signal is present. A transmitter circuit 22 is provided for transmitting the composite output pulse train *b* which is composed of the information-pulse train and either the framing-pulse train or the phase-inverted framing-pulse train. The first alarm circuit 14 is assumed, for simplicity of explanation, to include a direct-current power source 26 whose positive terminal is grounded, and a relay contact 28 which is to be closed when there is a fault in the transmission line starting at the transmitter of the participant station (not shown) and arriving at the receiver portion 12 of the illustrated station. Alarm circuit 14 supplies a negative voltage from the power source 26 to an alarm indicating device, such as a pilot lamp, (not shown), and to the transmitter portion 10. Among the various pulse trains generated (and illustrated in FIG. 2) by the clock-pulse source 16, to control the operation of the framing-pulse phase-control and inserting circuit 20 are: (1) an original framing-pulse train *c* having pulses at every time position of the pulses of the framing-pulse train *a*, (2) an original fault-indicating-pulse train *d* leading the original framing-pulse train *c*, (3) and a frame-clock-pulse train *e* which in turn leads the original fault-indicating-pulse train *d*. The frame-clock-pulse train *e* may be produced by extracting those pulses from the clock-pulse train at every frame period $T_O$ which are in a desired phase relation to the pulses of the framing-pulse train *a*. The original fault-indicating-pulse train *d* and the original framing-pulse train *c*, can be obtained by successively delaying the frame-clock-pulse train *e* or by differentiating the pulses of train *e* and taking out the leading and the trailing edges, respectively. Incidentally, in the wave forms of FIG. 2, the composite output pulse train *b* is shown as composed of the information-pulse train and of the framing-pulse train *a* as it stands. Also, the solid short vertical lines indicate "on" pulses or the presence of pulses, while the broken vertical pulses show that the pulses are in the "off" state or indicate the absence of pulses at the pulse positions represented thereby.

Continuing to FIGS. 1 and 2, the framing-pulse phase-control and inserting circuit 20 includes a fault-indicating-pulse generator 30 for producing, under the control of the alarm signal and of the original fault-indicating pulse-train *d* (and in the manner to be explained hereinafter), a single fault-indicating pulse *f* slightly after the alarm signal has appeared. An OR gate 32 is provided for transmitting either the frame-clock-pulse train *e* or the fault-indicating pulse *f* supplied thereto. Flip-flop circuit 34 driven by the output pulses of the OR gate 32 is provided for producing, before reception of the fault-indicating pulse *f*, a rectangular-wave output *g* which changes its state each time the pulses of the frame-clock-pulse train *e* are supplied thereto. Circuit 34 also produces after the fault-indicating pulse *f* is supplied thereto, a phase-inverted rectangular-wave output *g'* which also changes states at the time of reception of the fault-indicating pulse *f* and consequently thereafter changes the state in the phase-inverted relation to the rectangular-wave output *g*. An AND gate 36 is supplied with the output *g* or *g'* of the flip-flop circuit 34 and the original framing-pulse train *c*. This gate is opened and closed at the frame period $T_O$ by the rectangular-wave output *g* to change the original framing-pulse train *c* into the framing-pulse train *a* when fault indicating pulse *f* is absent. "And" gate 36 is opened and closed, after appearance of the fault-indicating pulse *f*, in the phase-inverted manner to change the original framing-pulse train *c* into the phase-inverted framing-pulse train *a'*. A combiner 38 is provided for combining the framing-pulse train *a* or *a'* and the information-pulse train supplied thereto into the composite output pulse train *b*. The operation of the framing-pulse phase-control and inserting circuit 20 and consequently the operation of the transmitter portion 10 is now clear from the foregoing description.

Figure 3:
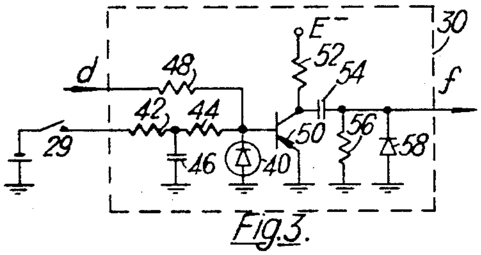
FIG. 3 is a circuit diagram of a fault-indicating-pulse generator used in the transmitter shown in FIG. 1.

The fault-indicating-pulse generator 30 of FIG. 1 is shown in detail in FIG. 3. Referring to FIG. 3, circuit 30 includes: a tunnel diode 40 whose anode is grounded; a first and a second resistor 42 and 44 connected serially between the relay contact 28 of the alarm device 14 and the cathode of the tunnel diode 40. Circuit 30 also includes a time-constant capacitor 46 connected between the junction point of the resistors 42 and 44 and ground. A pulse input resistor 48 is provided for supplying the original fault indicating-pulse train *d* to the cathode of the tunnel diode 40. Transistor 50 is connected at the base electrode thereof to the cathode of the tunnel diode 40 and at the emitter electrode thereof to ground; a collector resistor 52 is provided for supplying a voltage E− to the collector of transistor 50. A differentiating capacitor 54 is connected at one terminal thereof to the collector of the transistor 50. A differentiating resistor 56 is connected between the other terminal of the differentiating capacitor 54 and ground. A clamping diode 58 having a grounded anode is connected in parallel with the differentiating resistor 56.

Figure 2:
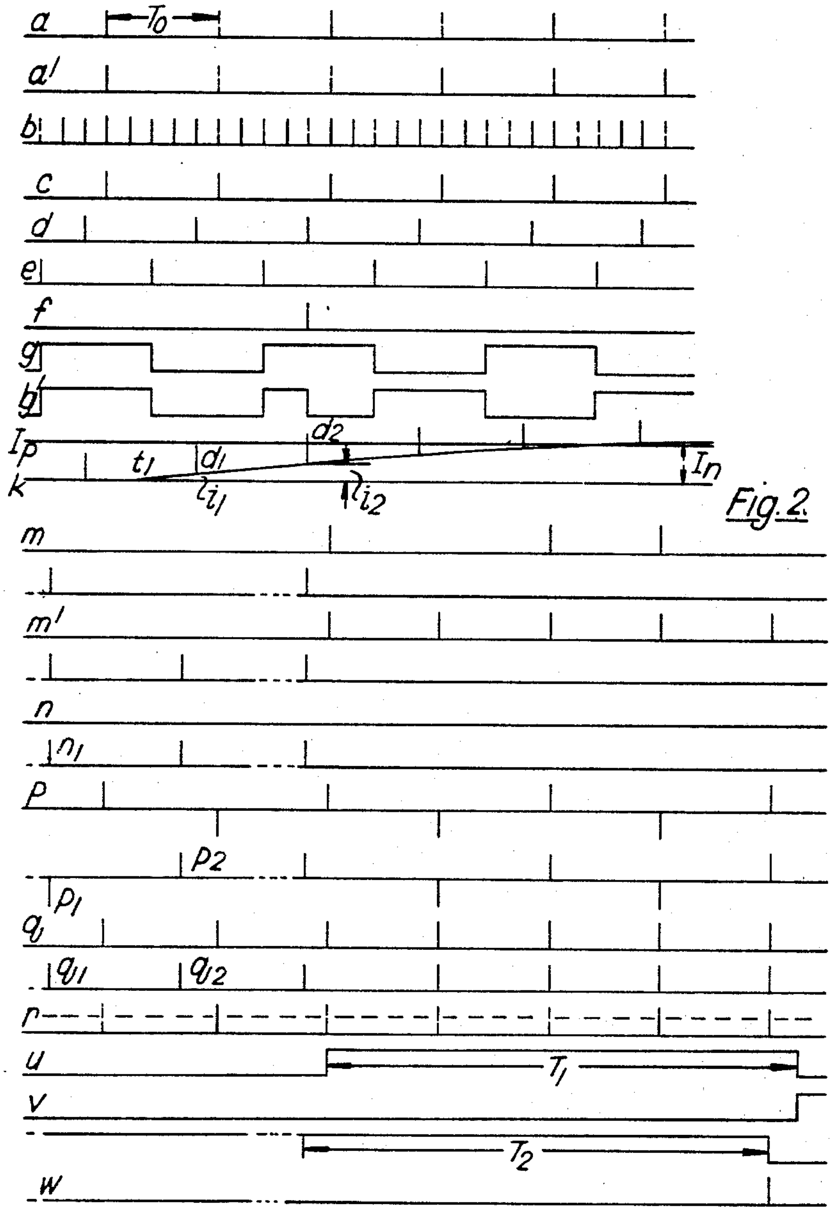
FIG. 2 illustrates wave forms of signals at various points in the terminal station of FIG. 1.
Figure 4:
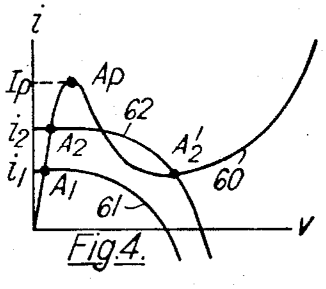
FIG. 4 illustrates characteristic curves of a circuit including a tunnel diode, which will be used to explain the operation of the circuit of FIG. 3.

Referring to FIG. 4, wherein the axis of abscissas shows the voltage $v$ across the tunnel diode of FIG. 3 and the ordinate axis plots the current $i$ flowing through the tunnel diode 40 in the forward sense, there is no current flowing through the tunnel diode 40 while the relay contact 28 remains open and during the time intervals between the pulses of the original fault-indicating-pulse train $d$ (illustrated in FIG. 2). Even if a pulse of the original fault-indicating-pulse train $d$ is supplied to the cathode of the tunnel diode 40, the tunnel diode 40 is maintained in the not-triggered state by setting the forward current of the tunnel diode 40 (caused to flow by said pulse) at a value smaller than a trigger level $I_p$ of the tunnel diode 40. It is assumed that the relay contact 28 will close at a time point $t_1$ to supply the alarm signal through a time-constant network comprising the first and the second resistors 42 and 44 and the time-constant capacitor 46, to the cathode of the tunnel diode 40. The relay contact 28 may chatter upon closing and protection against chatter is afforded by the time-constant circuit. In FIG. 2, such chatter is neglected. When the relay contact 28 is closed, the current flowing through the tunnel diode 40 increases (by virtue of the time-constant circuit) exponentially as illustrated in FIG. 2$h$. For a short while after the time point $t_1$, this current, which serves as the bias current, does not exceed the trigger level $I_p$ of the tunnel diode 40. This is true even if another forward current caused by a pulse $d_1$ of the original fault-indicating-pulse train $d$ is superimposed said current and even if chatter occurs at the relay contact 28, to keep the tunnel diode 40 untriggered. In more detail, let it be assumed that the bias current is $i_1$ when the pulses $d_1$ has just appeared during that short interval under consideration. Then, the resultant current will not reach a peak point $A_p$ in a characteristic curve 60 for the tunnel diode 40 (FIG. 3) and as a result the working point remains at a point of intersection $A_1$ between the characteristic curve 60 and a load curve 61 for the tunnel diode 40 which corresponds to the bias current $i_1$. After a certain time interval (predetermined by the time-constant circuit) has elapsed from the time point $t_1$, the bias current increases sufficiently so that another pulse $d_2$ of the original fault-indicating pulse train $d$ will trigger the tunnel diode 40. More particularly, when the forward current caused to flow by the pulse $d_2$ is superimposed on a bias current $i_2$ flowing at the time of appearance of the pulse $d_2$, the working point will move from a point $A_2$ at the lower-voltage intersection between the characteristic curve 60 and a load curve 62 for the tunnel diode 40 (corresponding to the bias current $i_2$) through the peak point $A_p$, to another point $A_2'$ at the higher-voltage intersection between these curves. Since transistor 50 is normally in the cut-off state, the collector electrode thereof will be maintained at the potential $E^-$ and the output terminal of the fault-indicating-pulse generator 30 is kept at zero potential because of the connection thereof through the differentiating resistor 56 to ground. When tunnel diode 40 is triggered, the difference between the currents flowing through the tunnel diode 40 before and after the trigger (namely, the current difference given by the lower-voltage intersection $A_2$ minus the current given by the higher-voltage intersection $A_2'$) flows as the base current of the transistor 50. This current turns transistor 50 "on," which in turn causes the collector potential to decrease stepwise to zero. This stepwise voltage is differentiated by a differentiating circuit which includes the differentiating capacitor 54 and the differentiating resistor 56 of FIG. 3. By cutting off the negative-going pulse of the voltage obtained by differentiation (with clamping diode 58) it is possible to obtain at the output terminal of the fault-indicating-pulse generator 30 a single fault-indicating pulse $f$ shortly after the alarm signal is generated. Incidentally, transistor 50 remains in the "on" state (after the working point of the circuit including the tunnel diode 40 has moved to the higher-voltage intersection $A_2'$) until the relay contact 28 is opened. As a result, the fault-indicating-pulse generator 30 never produces another output pulse even if additional pulses of the original fault-indicating-pulse train $d$ are supplied thereto.

Even if the alarm device 14 developed the alarm signal by opening of the relay contact 28, it is possible to use a similar fault-indicating-pulse generator 30. This can be done by reversing the polarity of the direct-current power source 26 of the alarm device 14, and by superimposing that bias current $I_n$ on the pulses of the original fault-indicating-pulse train $d$ (supplied to the pulse-input resistor 48 of the fault-indicating-pulse generator 30) which is larger than the trigger level $I_p$ of the tunnel diode 40 as shown by waveform $h$ of FIG. 2 and which flows in the forward sense of the tunnel diode 40. While the relay contact 28 is open, the power source 26 supplies, through the first and the second resistors 42 and 44, a steady backward bias current to the tunnel diode 40 and keeps the time-constant capacitor 46 in the charged state. This backward bias current cancels the forward bias current $I_n$. As a result, the transistor 50 is not turned on by the pulses of the original fault-indication-pulse train $d$. When the relay contact 28 is opened and the alarm signal is thus produced, the charge stored in the time-constant capacitor 46 is discharged through the second resistor 44 and the tunnel diode 40, the backward bias current of the tunnel diode 40 which was flowing while the relay contact 28 was still closed exponentially decreases. This corresponds, in cooperation with the existence of the forward bias current $I_n$, to an exponential increase of the forward bias of the tunnel diode 40. Thus, this fault-indicating pulse generator can also produce the fault-indicating pulse $f$ a short while after opening of the relay contact 28.

It is possible to make the alarm device 14 produce the alarm signal, not by closing or opening of a relay contact or a similar mechanical contact, but instead by means of a transistor, a diode, or a similar electronic switch. Also, it will be easy for those skilled in the art to manufacture in various ways a fault-indicating-pulse generator by referring to the example and modification given above.

Again returning to FIGS. 1 and 2, the receiver 12 of the terminal station illustrated as an embodiment of this invention includes: a receiver-synchronizing-pulse generator 66, which is supplied with a composite input pulse train which is designated $b$ in FIG. 2 because it is similar in form to the afore-mentioned composite output pulse train $b$ of FIG. 2. The input pulse train is received through the transmission line. Generator 66 produces in the known manner, a receiver-clock-pulse train and also generates, in the known manner, from the receiver-clock-pulse train, various other pulse trains which are to be used to control the operation of the receiver 12 and which are in synchronism with the received composite input pulse train $b$. A frame-synchronism monitoring circuit 68 is supplied with the composite input pulse train $b$ and various required pulse trains from generator 66 for comparing in effect the composite input pulse train $b$ with the frame-synchronism-discriminating-pulse train produced therein which has the same pattern as the transmitter-framing-pulse train $a$. Circuit 68 produces when code errors are present in the framing-pulse train $a$ of the composite input pulse train $b$, error pulses indicating the code errors. Circuit 68 produces a first-type of error-pulse train $m$ of FIG. 2 when the frame synchronism is in disorder, and produces a second type of error-pulse train $m'$ when the framing-pulse train has been changed to the phase-inverted framing-pulse train $a'$ in the composite input pulse train $b$. An error-pulse discriminating circuit 70 is supplied with the output of the frame-synchronism monitoring circuit 68 and the required pulse trains generated by the synchronizing-pulse generator 66. Circuit 70 operates to inhibit the operation of the synchronizing-pulse generator 66, (i.e. prevent hunting or any frame-synchronism-restoration operation) when only the code errors in the framing-pulse train $a$, are present. Circuit 70 produces a shift-pulse train $n$ for frame-synchronism-restoration operation, when the holding time $T_1$ has passed after reception of the first type error-pulse train $m$, and causes operation of the second alarm device 15 after reception of the second type error-pulse train $m'$. Utilization circuit 72 is supplied with the composite input pulse train $b$ and various require pulse trains produced by the synchronizing-pulse generator 66. Circuit 72 decodes the information-pulse train contained in the composite input pulse train $b$ for utilization at a telephone switchboard, not shown, etc. Among the various pulse trains produced by the synchronizing-pulse generator 66, including those used for controlling the frame-synchronism monitoring circuit 68 and the error-pulse discriminating circuit 70 is a frame-synchronism-monitoring-pulse train $p$. Pulse train $p$ has pulses, except during the hunting operation, at pulse positions of the framing-pulse train $a$ in the synchronized state which assumes an "on" state when the framing pulses are "on," and assume a polarity-inverted "on" state when the framing pulses are "off." Generator 66 also generates an error-pulse discriminating-pulse train $q$ having, except during the hunting operation, "on" pulses at all pulse positions of the framing-pulse train $a$ in the synchronized state.

Still referring further to FIG. 1, the frame-synchronism monitoring circuit 68 includes a pulse-state interchanger 75 for the input pulses for interchanging (reversing) the state of every pulse of the composite input pulse train $b$ supplied thereto; and a polarity inverter 76 for the monitoring pulses for inverting the polarity of every pulse of the frame-synchronism-monitoring pulse train $p$ supplied thereto. Circuit 68 also includes a first AND gate 77 which is supplied with two inputs, the frame-synchronism-monitoring-pulse train $p$ and the output of the pulse-state interchanger 75 for the input pulses. Circuit 68 also includes a second AND gate 78 which is also supplied with two inputs: the input-composite-pulse train $b$ and the output of the polarity inverter 76 for the monitoring pulses. An OR gate 79 is connected to receive the outputs from AND gates 77 and 78.

Referring again further to FIGS. 1 and 2, let it be assumed initially that the frame synchronism is correct or in good order. Then, the pulses supplied to one of the inputs of the first AND gate 77 at the time points where the pulses of the frame-synchronism-monitoring-pulse train $p$ are supplied to the other of the inputs, will be pulses of a pulse train which is derived by interchanging the pulse states of the framing-pulse train $a$ in the composite input pulse train $b$. Thus, the pulses supplied to gate 77 will be a pulse train which has the same pattern and phase as the phase-inverted framing-pulse train $a'$. These pulses are "off" pulses at the time points where the pulses supplied to the other input are positive, and are "on" or positive pulses when the pulses supplied to the other input are negative. As a result, the first AND gate 77 will produce no output pulses. In the second AND gate 78, the pulses supplied to one of the inputs thereof (at time points where the pulses of the polarity-inverted frame-synchronism-monitoring-pulse train are supplied to the other of the inputs) are pulses of the framing-pulse train $a$ in the composite input pulse train $b$ and are "on" (or positive pulses) when the pulses supplied to the other input thereof are negative pulses produced by inversion of the polarity, and are "off" pulses when the pulses supplied to the other input thereof are positive pulses produced by polarity inversion. Therefore, the second AND gate 78 also will produce no output pulses.

Next, let it be assumed that the frame synchronism is in good order while at the same time that the code errors are lasting for a very long time, although such long-lasting code errors do not appear in practice, in the composite input pulse train $b$ and hence in the framing-pulse train $a$ contained therein. In this case, the framing-pulse train contained in the composite input pulse train $b$ will assume the form of the phase-inverted framing-pulse train $a'$ with the result that the OR gate 79 will produce error pulses at a repetition period of the frame period $T_O$. Inasmuch as the above-assumed state can never occur in practice, the frame-synchronism monitoring circuit 68 sporadically produces error pulses which are spaced by positive-integral multiples of the frame period $T_O$.

Now, let is be assumed that although the frame synchronism is in good order, an alarm signal is being sent from the participant station (indicated by the presence of the phase-inverted framing-pulse train $a'$ in the composite input pulse train $b$). The first AND gate 77 will now produce output pulses at time positions where the latter pulses mentioned above are positive (because the above-mentioned former pulses are then "on" or positive pulses produced by inversion of the pulse state of the "off" pulses) and produces no output pulses at the time points where the latter pulses are negative (because the former pulses are then "off" pulses produced by pulse-state inversion from "on" pulses). The second AND gate 78 produces no output pulses at the time points where the aforesaid latter pulses are negative pulses derived through polarity inversion (because the above-mentioned former pulses are then "off" pulses at those time points) and produces output pulses at the time points where the latter pulses are positive pulses derived by the polarity inversion (because the former pulses are then "on" or positive pulses). Consequently, the frame-synchronism monitoring circuit 68 produces at its output (the output of gate 79) the second type error-pulse train $m'$ at a repetition period equal to the frame period $T_O$.

In the case of synchronism collapse, the pulses of the composite input pulse train $b$ supplied to the frame-synchronism monitoring circuit 68 (at time points where the pulses of the frame-synchronism-monitoring-pulse train $p$ are also supplied thereto) are those pulses of the information-pulse train which assume "on" and "off" states, not in accordance with a predetermined law, but according to the content of the information (as illustrated in curve $r$ of FIG. 2) only for the pulse positions of the frame-synchronism-monitoring pulse train $p$. Consequently, the frame-synchronism monitoring circuit 68 produces the first-type error-pulse train $m$ consisting of pulses spaced by positive-integral multiples of the frame period $T_O$. The difference between the error-pulse train produced by the code errors and the first-type error-pulse train $m$ resides in that the former is sporadic and does not last long while the latter endures until the frame-synchronism-restoration operation commences.

Still referring to FIGS. 1 and 2, the error-pulse discriminating circuit 70 includes a holding-time monostable circuit 80, which is driven by the output of the frame-synchronism monitoring circuit 68 and which produces a holding-time output $u$ which is in the "on" state so as to establish the so-called holding time interval $T_1$ for preventing the hunting operation from being initiated by the code errors and for producing, after the shift-pulse train $n$ disappeared, a no holding-time output during a frame-synchronism discriminating-time interval $T_2$ so that the hunting operation once begun will not be disturbed by the pseudo-framing-pulse train. A shift-pulse producer 82 is supplied with the output of the holding-time monostable circuit 80 (as an inhibit input) and with the output of the frame-synchronism monitoring circuit 68 as another input. Circuit 82 produces the shift-pulse train $n$ of FIG. 2 for commencing the hunting operation. A first AND gate 85 is supplied with the output of the frame-synchronism monitoring circuit 68 (as an inhibit input) and with the pulses of the error-pulse-discriminating-pulse train $q$ of FIG. 2 and the output of the holding-time monostable circuit 80 as two other inputs. A discriminating-time monostable circuit 87 is driven by trailing edge of the holding-time output $u$ to produce a discriminating-time output $v$ which is kept in the "on" state while the pulses of the shift-pulse train $n$ are present and is reset a predetermined frame-synchronism discriminating-time interval $T_2$ after disappearance of the pulses of the shift-pulse train $n$ which is supplied as an inhibit input to the holding-time monostable circuit 80. A differentiating circuit 89 is provided for differentiating the output of the discriminating-time monostable circuit 87 to produce at the trailing edge of the "on" output thereof a first reset pulse $w$ of FIG. 2. A first flip-flop circuit 91 is set by the output of the first AND gate 85 and reset by the first reset pulse $w$. A second AND gate 93 is supplied with the set output of the first flip-flop circuit 91 (as an inhibit input) and with the output of the shift-pulse producer 82 as another input. A second flip-flop circuit 95 is set by the output of the second AND gate 93 and reset by a second reset pulse $z$ of FIG. 2 given manually or otherwise. The second alarm device 15 is operated by the output of the second flip-flop circuit 95 which is produced when this second flip-flop circuit 95 is set.

Further continuing to refer to FIGS. 1 and 2, the description of the operation of the error-pulse discriminating circuit 70 will be continued along with a further description of the operation of the frame-synchronism monitoring circuit 68.

As long as frame synchronism is in order and no error pulse is produced, the holding-time monostable circuit 80 will never be triggered and never turns the holding-time output $u$ (of FIG. 2) to the "on" state. The shift-pulse producer 82 has no inhibit input supplied by the holding-time output $u$ and also no error-pulse input, so that it does not produce the shift-pulse train $n$. On the other hand, the first AND gate 85 produces no pulses because the holding-time output $u$ is in the "off" state. Therefore, the first flip-flop circuit 91 is never set. The second AND gate 93 never produces pulses because although there is no inhibit input, neither are those pulses of the shift-pulse train $n$. Thus, the second flip-flop circuit 95 is never set, and the second alarm device 15 is not operated. Incidentally, the discriminating-time monostable circuit 87 is not triggered, and never turns the discriminating time output $v$ to the "on" state, because the holding-time output $u$ never assumes the "on" state. The differentiating circuit 89 never produces the first reset pulse $w$.

When frame synchronism is in order and yet sporadic error pulses are present due to the code errors, the holding-time monostable circuit 80 receives no inhibit input and is consequently triggered by the first one of the error pulses to turn the holding-time output $u$ to the "on" state. The holding-time monostable circuit 80 turns (when the holding-time interval $T_1$ has just passed) the holding-time output $u$ to the "off" state and never turns the holding-time output $u$ to the "on" state again, because the sporadic error pulses no longer appear after the holding-time interval $T_1$ has elapsed. The shift-pulse producer 82 does not allow during the holding-time interval $T_1$, all the error pulses (including the first of error pulses) to appear at its output as the pulses of the shift-pulse train $n$ and it does not produce the pulses of the shift-pulse train $n$ after the holding-time interval $T_1$ has elapsed, because the sporadic error pulses no longer appear. On the other hand, during the holding-time interval $T_1$ where the holding-time output $u$ is in the "on" state, the first AND gate 85 allows the pulses of the error-pulse-discriminating-pulse train $q$ to pass therethrough when the sporadic error pulses do not arrive at the time positions of the pulses of the former, and does not allow any pulses to pass therethrough when the sporadic error pulses appear at time positions of the pulses of the error-pulse-discriminating-pulse train $q$ to serve as the inhibit input. After the holding-time interval $T_1$ has elapsed, this AND gate 85 produces no output pulses, because the holding-time output $u$ cuts them off. The discriminating-time monostable circuit 87 is triggered, when the holding-time interval $T_1$ has just passed, to turn the discriminating-time output $v$ to the "on" state. The discriminating-time output $v$ is turned off when the holding-time interval $T_1$ has passed and also when the discriminating-time interval $T_2$ has passed, because there are no pulses of the shift-pulse train $n$ after the holding-time interval $T_1$ has elapsed. The discriminating-time output $v$ supplied to the holding-time monostable circuit 80 as the inhibit input, are ineffectual because the sporadic error pulses no longer appear. When the inhibit input is turned off, the holding-time monostable circuit 80 returns completely to the initial state thereof and is now ready for any error pulse which will appear thereafter. The differentiating circuit 89 produces the first reset pulse $w$ at the end of the discriminating-time interval $T_2$. Now, the first flip-flop circuit 91 is set by the first pulse appearing on the output side of the first AND gate 85 and is no longer effected by the succeeding pulses, if any appearing on that output side. Flip-flop 91 is reset, at the end of the discriminating-time interval $T_2$, by the first reset pulse $w$ to become ready for a subsequent operation. The second AND gate 93 produces no output pulses, because there are no pulses of the shift-pulse train $n$ when there is no inhibit input during the holding-time interval $T_1$ before the setting of the first flip-flop circuit 91 and when flip-flop circuit 91 is set to supply the inhibit input during the holding-time interval $T_1$. Thus, the second flip-flop circuit 95 is never set and the second alarm device 15 is never set into operation.

When the second-type error-pulse train $m'$ is present on the output side of the frame-synchronism monitoring circuit 68, the holding-time monostable circuit 80 is triggered by the first of the error pulses, and this turns the holding-time output $u$ to the "on" state. When the holding-time interval $T_1$ has just passed, the holding-time monostable circuit 80 turns the holding-time output $u$ "off," it cannot turn the holding-time output $u$ again to "on" because after the holding-time interval $T_1$ has elapsed, the discriminating-time output $v$ serves as an inhibit input until the discriminating-time interval $T_2$ elapses after the error pulses disappeared. The shift-pulse producer 82 does not allow (during the holding-time interval $T_1$) all the error pulses including the first pulse to become the pulses of the shift-pulse train $n$, and causes the first pulse of the second-type of error-pulse train $m'$ arriving after the holding-time interval $T_1$ has elapsed, to appear as a first shift pulse $n_1$. On the other hand, the first AND gate 85 produces no output pulses during the holding-time interval $T_1$ where the holding-time output $u$ is "on." This is so because at the time points when the pulses of the error-pulse-discriminating-pulse train $q$ reaches gate 85, the pulses of the second-type of error-pulse train $m'$ also arrives at gate 85 as an inhibit input. Thus, gate 85 produces no output pulses, after the holding-time interval $T_1$ has elapsed, because the holding-time output $u$ is in the "off" position. The discriminating-time monostable circuit 87 is triggered, when the holding-time interval $T_1$ has just passed, to turn the discriminating-time output $v$ *"on."* Circuit 87 by its own functioning keeps the discriminating-time output $v$ in the "on" state, after the holding-time interval $T_1$ has elapsed, through the first shift pulse $n_1$ and the succeeding shift pulses (and after the pulses of the shift-pulse train $n$ has disappeared) until the discriminating-time interval $T_2$ elapses. When the discriminating-time interval $T_2$ has just passed, the discriminating-time output $v$ is turned off. The differentiating circuit 89 produces the first reset pulse $w$ at the end of the discriminating-time interval $T_2$. Now, the first flip-flop circuit 91 is not set because the output pulses do not appear on the output side of the AND gate 85, and does not respond even when the first reset pulse $w$ does appear. The second AND gate 93 allows (because no inhibit input is supplied thereto) the first shift pulse $n_1$, appearing after the lapse of the holding-time interval $T_1$, to pass therethrough along with the succeeding pulses of the shift-pulse train $n$. The second flip-flop circuit 95 is set by the first shift pulse $n_1$ which passed through the second AND gate 93 and is kept in the set state until the application of the second reset pulse $z$. Thus, the second alarm device 15 will be activated by the first error pulse which appears when the holding-time interval $T_1$ has passed after appearance of the second type of error-pulse train $m'$.

The first shift pulse $n_1$ and the succeeding shift pulses perform the well-known hunting operation which is carried out when the frame synchronism was forcibly disrupted (and which had been in order until that time). More particularly, the first shift pulse $n_1$, not only keeps the discriminating-time monostable circuit 87 in the triggered state (acting through the second AND gate 93 on the second alarm device 15) but also acts on the synchronizing-pulse generator 66 to convert the first frame-synchronism monitoring pulse $p_1$ (although shown in the drawing as a negative pulse, this may be a positive pulse) of the frame-synchronism monitoring-pulse train $p$ along with the specific error-pulse discriminating pulse $q_1$ of the error-pulse-discriminating-pulse train $q$ (which appeared simultaneously with the specific frame-synchronism monitoring pulse $p_1$) as well as pulses of the frame-synchronism-monitoring-pulse train $p$ and the error-pulse-discriminating-pulse train $q$ (which follow the specific pulses $p_1$ and $q_1$) respectively, into delayed frame-synchronism monitoring pulses $p_2$ such as the delayed error-pulse discriminating pulse $q_2$. Pulses succeeding the first converted pulses which lag behind said pulses by one clock period or by the spacing between the neighboring pulse positions of the composite-pulse train $b$ are similarly converted (pulses leading the converted pulses may lag (or lead) each other by a plurality of clock periods). The frame-synchronism monitoring circuit 68 selects a pulse of the information-pulse train by this delayed frame-synchronism monitoring pulse $p_2$. Depending on the mutual pulse-state relation between the selected pulse of the information-pulse train and the delayed frame-synchronism monitoring pulse $p_2$, an error pulse may or may not be produced. If an error pulse is produced, the error-pulse discriminating circuit 70 produces another shift pulse succeeding the above-mentioned first shift pulse $n_1$ so as to proceed with the hunting operation. If no error pulse is produced, the error-pulse discriminating circuit 70 produces no shift pulse. If pulses of a pseudo-framing-pulse train in the information-pulse train are successively selected, this no-pulse-producing state may last a long time, which is shorter than the discriminating-time interval $T_2$. In any case, an error pulse appears, within the discriminating-time interval $T_2$ after frame synchronism was forcibly disrupted, to continue the hunting operation. During all this time, the first flip-flop circuit 91 is held in the reset state, and the second flip-flop circuit 95, in the set state.

As a result of the hunting operation, each pulse of the frame synchronism-monitoring-pulse train $p$ will eventually be delayed by one frame period $T_O$ so that the frame synchronism which was forcibly disrupted can be recovered. At this time, the frame-synchronism monitoring circuit 68 is supplied with the phase inverted framing-pulse train $a'$ and a frame-synchronism monitoring-pulse train of the same pattern and phase as said pulse train $a'$. As a result, no error pulse will be produced over a longer time interval than the discriminating-time interval $T_2$ and in addition no shift pulse will be produced. When the discriminating-time-interval $T_2$ has expired after the shift pulses disappeared, the discriminating-time output $v$ is turned off to permit the holding-time monostable circuit 80 to receive error pulses which may appear later and to send the first reset pulse $w$ to the first flip-flop circuit 91. During this period, the first and the second flip-flop circuits 91 and 95 are kept in the reset and the set states, respectively.

When the first-type error-pulse train $m$ appears at the output of the frame-synchronism monitoring circuit 68, the holding-time monostable circuit 80 and the shift-pulse producer 82 operate even after the holding-time interval $T_1$ has elapsed in a manner similar to this operation when the second-type error-pulse train $m'$ is present. In contrast, the first AND gate 85 allows (because the first-type-error-pulse train $m$ does not necessarily have error pulses at every frame period $T_O$ within the holding-time interval $T_1$) that pulse of the error-pulse-discriminating-pulse train $q$ to pass there-through which appeared at the first pulse position where the inhibit input was not present within the holding-time interval $T_1$. This pulse sets the first flip-flop circuit 91 to supply the inhibit input to the second AND gate 93. Inasmuch as the first flip-flop circuit 91 is kept in the set state until the first reset pulse $w$ appears, the second AND gate 93 does not cause the pulses of the shift-pulse train $n$ (even though supplied thereto after the lapse of the holding-time interval $T_1$) to pass therethrough, so as not to operate the second alarm device 15. When each pulse of the frame-synchronism-monitoring-pulse train $p$ and the error-pulse-discriminating-pulse train $q$ is turned into each of the delayed frame-synchronism monitoring and error-pulse discriminating pulses $p_2$ and $q_2$ by the first shift pulse $n_1$ appearing after a lapse of the holding-time-interval $T_1$, the frame-synchronism monitoring circuit 68 produces or does not produce error pulses depending on the pulse-state relation between the delayed frame-synchronism monitoring pulse $p_2$ and that pulse of the information-pulse train which appears simultaneously therewith. Although an error pulse may disappear and a shift or delay of the frame-synchronism monitoring pulses may not be performed (when the pulses of the information-pulse train happen to assume at every frame period $T_O$ the pulse state of the framing-pulse train $a$) the hunting operation will be continued by the error pulses which will eventually appear during the discriminating interval $T_2$. While the hunting operation is occurring during the discriminating-time interval $T_2$, the first AND gate 85 produces no output because the holding-time output $u$ remains in the "off" state; the first flip-flop circuit 91 is kept in the set state because the first reset pulse $w$ is not yet supplied thereto; and the second AND gate 93 is held by the inhibit input in a state which prevents pulses of the shift-pulse train $n$ to pass therethrough. When the hunting operation causes the pulses of the shift-pulse train $n$ no longer appear over a longer time interval than the discriminating-time interval $T_2$; the discriminating-time output $v$ is turned off to prepare the holding-time monostable circuit 80 for the error pulses which may subsequently appear; and the first reset pulse $w$ resets the first flip-flop circuit 91 to make the second AND gate 93 ready for the set output of this flip-flop circuit 91 or the pulses of the shift-pulse train $n$ (either of which may appear afterwards).

Figure 5:
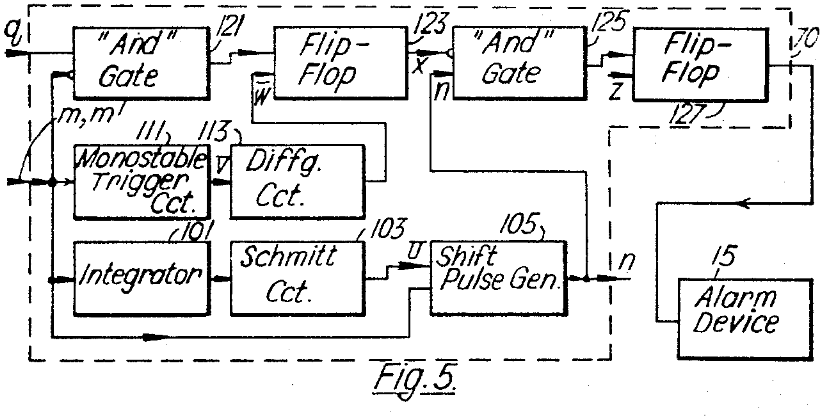
FIG. 5 is a block diagram of circuitry for the error-pulse discriminating circuit in the receiver illustrated in FIG. 1.
Figure 6:
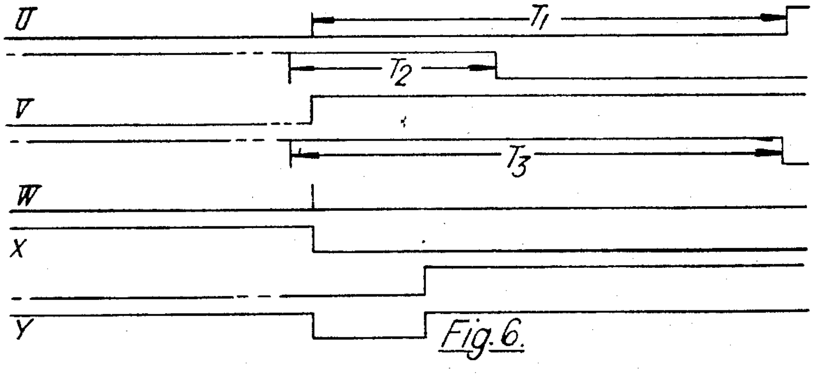
FIG. 6 illustrates wave forms of signals at various points in the circuit of FIG. 5.

Referring now to FIGS. 5 and 6, there is illustrated therein another example of the error-pulse discriminating circuit 70 of FIG. 1. This circuit includes an integrator 101 for integrating and storing therein the pulses appearing at the output of the frame-synchronism monitoring circuit 68 and for producing an output voltage which reaches a predetermined level (after a number of pulses preselected in accordance with each pattern of the pulse arrangement), have been stored therein. For example, said output voltage of predetermined level will be generated when a holding-time interval $T_1$ has passed, if the pulses appearing on the output side of the frame-synchronism monitoring circuit 68 are arranged according to the average of the various first-type error-pulse trains $m$. Said output voltage may also be generated when a quasi-holding-time interval $T_1'$ (shorter in duration than the holding-time interval $T_1$) has passed if the pulses appearing at the output are arranged in the manner of the second-type of error-pulse train $m'$. The number of pulses or the quotient derived by dividing the holding-time interval $T_1$ by the pulse spacing of the pulse train having the average pattern of the various first-type error-pulse train *m* is greater than the number of pulses or the quotient obtained by dividing the quasi-holding-time interval $T_1'$ by the pulse interval of the second-kind error-pulse train *m'* or the frame period $T_O$) and which falls below the predetermined level an operating-time interval T after the error pulses disappeared. A Schmitt circuit 103 is provided to produce a stepwise output U (of FIG. 6) while the output voltage of the integrator 101 is higher than the predetermined level. A shift-pulse generator 105, is supplied with the pulses from the output of the frame-synchronism monitoring circuit 68 and the stepwise output U, and generates the pulse of the shift-pulse train *n*. A monostable circuit 111 is triggered by the pulses appearing on the output side of the frame-synchronism monitoring circuit 68, and generates a warranting-time output V (of FIG. 6) which assumes the "on" state after being triggered until the operation-warranting-time interval $T_3$ has passed after the trigger pulses disappeared which may be longer than the operating-time interval T. A differentiating circuit 113 differentiates the leading edge of the warranting-time output V to produce a first reset pulse W (of FIG. 6). AND gate 121 is supplied (as an inhibit input) with pulses appearing on the output side of the frame-synchronism monitoring circuit 68 as well as with the pulses of the error-pulse-discriminating-pulse train *q*. A first flip-flop circuit 123 is set by the output of the first AND gate 121 to produce a set output X (of FIG. 6) until it is reset by the first reset pulse W (of FIG. 6). A second AND gate 125 is supplied with the set output X of the first flip-flop circuit 123 (as an inhibit input thereto) as well as with the pulses of the shift-pulse train *n*. A second flip-flop circuit 127 is set by the output of the second AND gate 125 and reset by a second reset pulse Z (of FIG. 6) supplied manually or otherwise thereto. The set output of the second flip-flop circuit 127 operates the second alarm device 15.

Referring further to FIGS. 5 and 6, in conjunction with FIG. 2, the description will now detail the mode of operation of the error-pulse discriminating circuit 70 and reconsideration will be given to the operation of the frame-synchronism monitoring circuit 68.

When the frame synchronism is in order and if the error pulse is not present the integrator 101 will produce no output. The Schmitt circuit 103 therefore also produces no output. Inasmuch as there are no inputs at both terminals, the shift-pulse producer 105 produces no pulse of the shift-pulse train *n*. The monostable circuit 111 is not triggered, and the differentiating circuit 113 produces no output. The first AND gate 121 allows the pulses of the error-pulse-discriminating-pulse train *q* to pass therethrough because no inhibit input is supplied thereto. The first flip-flop circuit 123 was set by the first pulse of the error-pulse-discriminating-pulse train *q* which was produced when the receiver 12 was set into operation. The second AND gate 125 produces no output because the inhibit input signal is supplied thereto and because no pulse of the shift-pulse train *n* is supplied thereto. The second flip-flop circuit 127 is never set because no set input is supplied thereto. Therefore, the second alarm device 15 will never be operated.

If the frame synchronism is in order but there are sporadic error pulses appearing as a result of the code errors, the integrator 101 integrates these error pulses. Inasmuch as the error pulses will soon disappear, the output voltage will never reach the predetermined level. Therefore, the Schmitt circuit 103 is not operated to turn the stepwise output U to the "on" state. The shift-pulse producer 105 does not allow the sporadic error pulses supplied thereto at one of the inputs to pass therethrough because there is no stepwise output U supplied to its other input. The monostable circuit 111 is triggered to turn the warranting-time output V to the "on" state and returns (when the warranting-time interval $T_3$ has passed after the sporadic error pulses disappeared), to the initial state to be prepared for subsequent operation. The differentiating circuit 113 produced a first reset output W when the first error pulse appeared. The first AND gate 121 allows the pulses of the error-pulse-discriminating-pulse train *q* to pass therethrough before appearance of the sporadic error pulses and after disappearance thereof. It also allows said pulses to pass when the error pulses are not supplied thereto as the inhibit input at the time positions of appearance of the pulses of the error-pulse-discriminating-pulse train *q*. However, gate 121 does not allow said pulses to pass therethrough when the error pulses are supplied thereto as the inhibit input at those pulse positions where the pulses of the error-pulse-discriminating-pulse train *q* appear. The first flip-flop circuit 123 is reset by the first reset pulse W when the first error pulse has appeared. This flip-flop circuit 123 remains in the reset state, if error pulses appear thereafter; at every frame period $T_O$ but is again set, after the error pulses has disappeared, as soon as the first AND gate 121 produces an output. Irrespective of the presence or absence of the set input, the second AND gate 125 produces no output because no pulses appear in the shift-pulse train *n*. Thus again, the second alarm device 15 will not be operated.

When the second type error-pulse train *m'* appears, the output voltage of the integrator 101 reaches the predetermined level when the quasi-holding-time interval $T_1'$ has passed after appearance of the first pulse of this error-pulse train *m'*. The Schmitt circuit 103 therefore produces the stepwise output U after the lapse of the quasi-holding-time interval $T_1'$. The shift-pulse generator 105 does not produce, (until the lapse of the quasi-holding-time interval $T_1'$) the pulses of the shift-pulse train *n* because no input is applied to one of the inputs thereof. Generator 105 supplies pulses of the shift-pulse train *n* which initiates the hunting operation, after the lapse of the quasi-holding-time interval $T_1'$. These pulses may have been the pulses appearing on the output side of the frame-synchronism monitoring circuit 68. The first AND gate 121 sends out (until appearance of the second-type pulse train *m'*) pulses of the error-pulse-discriminating-pulse train *q*. It does not send out these pulses after the appearance of the second-type pulse train *m'*, because the pulses thereof appear at the same time positions as the pulses of the error-pulse-discriminating-pulse train *q* which serve as the inhibit input. If no error pulse appears at the same time position as a pulse of the error-pulse-discriminating-pulse train *q* (due to the hunting operation or due to other reasons) the first AND gate 121 again will produce the output. The first flip-flop circuit 123 remains, before appearance of the first error pulse, in the set state established by the first pulse of the error-pulse-discriminating-pulse train *q* produced when the receiver 12 was set into operation. Flip-flop 123 is reset by the first reset pulse W, as soon as the first error pulse appears, to turn the set output X off. When the first AND gate 121 produces an output as a result of the hunting operation etc., flip-flop circuit 123 is again set to turn "on" the set output X. The second AND gate 125 does not produce an output until the set output X is at first in the "on" state and (even after the set output X is turned off) until the quasi-holding-time interval elapses. This is so because no pulse appears in this interval in the shift-pulse train *n*. When the quasi-holding-time interval $T_1'$ elapses and the first pulse $n_1$ of the shift-pulse train *n* appears, the second AND gate 125 passes the first shift pulse $n_1$ out to the output side. Until the reset output X again assumes the "on" state, the second AND gate 125 will allow the pulses of the shift-pulse train *n* to appear on the output side. The second flip-flop circuit 127 is set by the first shift pulse $n_1$ to operate the second alarm device 15.

When the first-type error pulse train *m* appears, the output voltage of the integrator 101 rises to the predetermined level when the holding-time interval $T_1$ has nearly expired after the appearance of the first pulse of this error-pulse train *m* or when that time interval has just passed after said appearance (which depends on the pulse arrangement of this error-pulse train *m*). Responsive to this output voltage, the Schmitt circuit 103 produces the stepwise output U. The shift-pulse producer 105 does not derive, until the appearance of the stepwise output U, the pulse of the shift-pulse train *n* because no input is supplied to one of the inputs. Rather, it sends out as the pulses of the shift-pulse train *n* (after the stepwise output U appears) the pulses, if any, appearing on the output side of the frame-synchronism monitoring circuit 68 to effect the hunting operation. The first AND gate 121 allows, before appearance of the first-type error-pulse train *m*, the pulses of the error-pulse-discriminating-pulse train *q* to appear on the output side thereof. However, when the pulses of the error-pulse train *m* appear, gate 121 produces no output at those time positions where these pulses appear simultaneously with the pulses of the error-pulse-discriminating-pulse train *q* which serve as the inhibit input, and provides an output at time positions where the former pulses do not appear simultaneously with the latter pulses. The first flip-flop circuit 123 remains (until the appearance of the first error pulse) in the state set by the first pulse of the error-pulse-discriminating-pulse train *q* produced when the receiver 12 was set into operation. It is reset, upon the appearance of the first error pulse, by the first reset pulse W to turn the set output X into the "off" state. When the first-type error-pulse train *m* is present, at least one pulse will be produced on the output side of the first AND gate 121 within a time interval nearly equal to the holding-time interval $T_1$. Thus, the flip-flop circuit 123 will be set again within a time interval nearly equal to the holding-time interval $T_1$ to turn the set output X again into the "on" state as illustrated by curve Y of FIG. 6. If the set output Y is initially "on" and is then turned "off," the second AND gate 125 produces no output because there are no pulses of the shift-pulse train *n*. Inasmuch as the set output Y is on before lapse of the time interval nearly equal to the holding-time interval $T_1$, this AND gate 125 will allow the pulses if any of the shift-pulse train *n* to pass therethrough after lapse of a time interval nearly equal to the holding-time interval $T_1$. Consequently, the second flip-flop circuit 127 is never set, and the second alarm device 15 is never operated.

With the error-pulse discriminating circuit 70 of FIG. 5, the time interval between the arrival of the first error pulse to circuit 70 and the production by the shift-pulse producer 105 of the first pulse of the shift-pulse train *n* depends on that distribution of the error pulses which in turn determines the time required for the output voltage of the integrator 101 to reach a predetermined level. However, the selection of that shortest duration of the above-mentioned time interval, namely, the quasi-holding-time interval $T_1'$ is shorter than the holding time interval $T_1$, and thus it matters little in discriminating whether the first-type or the second-type error-pulse trains *m* and *m'* is contained in the output of the frame-synchronism monitoring circuit 68. Incidentally, the warranting-time interval $T_3$ is provided in view of the fact that it is impossible to settle for a sufficiently long period the operating-time interval T of the integrator 101 of the error-pulse discriminating circuit 70 (shown in FIGURE 5). Interval $T_3$ prevents any misoperation and warrants the proper function of the frame-synchronizing device even when a pseudo-framing-pulse train appears in the information-pulse train. More particularly, the inherent leakage in the integrator 101 causes the output voltage which reached the predetermined level to decrease below that level. The control output of the Schmitt circuit 103 for the shift-pulse producer 105 then closes the shift-pulse producer 105 to the error pulses. If an error pulse appears thereafter (due to the code error), the output voltage of the integrator 101 will again rise above the predetermined level to improperly open the shift-pulse producer 105 for subsequent error pulses. In order to avoid this undesired opening, the operating-time interval T of the integrator 101 would have to be very long. It is consequently necessary with this error-pulse discriminating circuit 70 to prevent the misoperation by the warranting-time interval $T_3$. The warranting-time interval $T_3$ must, not be too long. Rather, it should be a compromise so as not to prevent the error-pulse discriminating circuit 70 from being set into operation by the second-type error-pulse train *m'* (which might follow soon after the sporadic error pulses caused by the code errors or otherwise and which kept the monostable circuit 111 in the "on" state.

A set of typical values for the holding-time interval $T_1$ and the like when the frame period $T_O$ is 125 microseconds is indicated below. The holding-time interval $T_1$, the discriminating-time interval $T_2$, the operating-time interval T, and the warranting-time interval $T_3$ were 3, 3, 0.5 and 2–3 milliseconds respectively.

While in the above explanation of the embodiment of this invention the framing-pulse train has been assumed to have pulse positions at every frame period, the spacing between the neighboring pulse positions may not be equal to one frame period but may be any other predetermined periods which are preferably a simple integral multiple or submultiple of the frame period. Likewise, it would be easy for those skilled in the art to devise other various embodiments without departing from the spirit of this invention.

To summarize, it will now be clear that an improved alarm system for use in a two way pulse code communication system has been disclosed. The PCM system has at least two stations, each including a transmitter 10 and a receiver 12 portion. Said stations exchange information by transmitting information pulse trains therebetween which include framing synchronizing pulses having a preset pattern. Each station also includes alarm signalling means 14, 15 for generating a fault alarm signal responsive to faults occurring in the transmission medium between the receiver portion 12 of each station and the transmitter portion 10 of the other station. The improved fault alarm system of this invention includes frame synchronizing signal control means 20 in the transmitter portion of each station responsive to the generation of a fault alarm signal in said station, for converting the preset frame synchronizing pulse pattern in the information pulse train being transmitted into an alarm indicating framing pulse pattern. The alarm system also includes error signal generating means 68, 70 in the receiver portion of each station for monitoring the frame synchronizing signals contained in the received information pulse train and for generating a first error signal when frame synchronism is lost but said preset framing pulse pattern is present, and for generating a second error signal when the alarm indicating framing pulse pattern is present. The alarm system further includes means for supplying said second error signals to activate said alarm signalling means 14, 15. Thus, faults in the transmission medium between said stations will not only activate the alarm signalling means of all stations but also will disrupt the frame synchronism of all said stations by converting said preset pattern to the said alarm indicating pattern.

In addition, this invention discloses that frame synchronizing restoring means 66 can be provided and connected to receive said first error signal for restoring lost frame synchronism so that minor losses in frame synchronism will be corrected without activating the alarm signalling means and without interrupting the normal operation of said stations.

While we have described above the principles of our invention in connection with specific embodiments, it is to be clearly understood that this description is made only by way of example, and not as a limitation to the scope of our invention as set forth in the objects thereof and in the accompanying claims.

What is claimed is:

1. An improved alarm system for use in a two way pulse code communication system having at least two stations, each including a transmitter and a receiver portion, said stations exchanging information by transmitting information pulse trains therebetween which include frame synchronizing pulses having a preset pattern, each station including alarm signalling means for generating a fault alarm signal responsive to faults occurring in the transmission medium between the receiver portion of each station and the transmitter portion of the other station, the improved fault alarm system comprising in each station:

(A) frame synchronizing signal control means in the transmitter portion, responsive to the generation of a fault alarm signal in said station, for converting the preset frame synchronizing pulse pattern in the information pulse train being transmitted into an alarm indicating framing pulse pattern;

(B) error signal generating means in the receiver portion for monitoring the frame synchronizing signals contained in the received information pulse train and for generating a first error signal when frame synchronism is lost but said preset framing pulse pattern is present, and for generating a second error signal when the alarm indicating framing pulse pattern is present; and (C) means for supplying said second error signals to activate said alarm signalling means, whereby faults in the transmission medium between said stations will not only activate the alarm signalling means of all stations but also will disrupt the frame synchronism of all said stations by converting said preset pattern to the said alarm indicating pattern.

2. An improved alarm system as set forth in claim 1 wherein frame synchronizing restoring means are provided and connected to receive said first error signal for restoring lost frame synchronism whereby a minor loss in frame synchronism will be corrected without activating the alarm signalling means and without interrupting the normal operation of said stations.

3. An improved alarm system as set forth in claim 2 wherein said error signal generating means includes: frame synchronism monitoring means which generates said first and second error signals in response to the received information signals; and discriminator means connected to said frame synchronism monitoring means for identifying said error signals, and for supplying said first error signals to said frame synchronism restoring means and for supplying only said second error signals to activate said alarm signalling means.

4. An improved alarm sytsem as set forth in claim 3 wherein said discriminator means includes means for ascertaining whether the first error signals were generated in response to sporadic frame synchronizing code errors which require no correction and for preventing the application of said first error signals to said frame synchronizing restoring means whenever said first error signals were generated in response to said sporadic code errors.

5. An improved alarm system as set forth in claim 4 wherein successive framing pulses in said information pulse train normally are of opposite polarity and wherein said frame synchronizing signal control means, responsive to an alarm signal, insert framing pulses of the same polarity into said information pulse train being transmitted in place of said opposite polarity framing pulses thereby to form said alarm indicating framing pulse pattern.

6. An improved alarm system as set forth in claim 5 wherein the first and second error signals generated by said frame synchronism monitoring means are pulse trains which retain the framing pulse pattern contained in the received information pulse train and wherein said discriminator means discriminates the polarity of successive framing pulses contained in said error signals supplied thereto, framing pulses of opposite polarity indicating said first error signal is present, framing pulses of the same polarity indicating said second error signal is present.

7. An improved alarm system as set forth in claim 6 wherein said ascertaining means includes delay means for delaying the application of said first error signals to said frame synchronizing restoring means for a predetermined interval, said ascertaining means ascertaining whether said first error signal was generated in response to cyclic repetitive errors which indicate a loss of synchronism, said ascertaining means preventing the application of said first error signals to the frame synchronism restoring means when said first error signal contains sporadic frame synchronizing pulse errors.

References Cited

UNITED STATES PATENTS

| | | | |
|---|---|---|---|
| 3,057,972 | 10/1962 | Mann | 179—175 |
| 3,112,370 | 11/1963 | Longton | 179—15 |
| 3,251,034 | 5/1966 | Goode et al. | 340—146.1 |
| 3,259,695 | 7/1966 | Murakami | 179—15 |

ROBERT L. GRIFFIN, *Primary Examiner.*

C. R. VON HELLENS, *Assistant Examiner.*

U.S. Cl. X.R.

179—15

UNITED STATES PATENT OFFICE

CERTIFICATE OF CORRECTION

Patent No. 3,430,144 February 25, 1969

Ryuichi Murakami et al.

It is certified that error appears in the above identified patent and that said Letters Patent are hereby corrected as shown below:

Column 2, line 57, "to see whether the error-pulse train, if present, is of the" should read -- produced when the frame synchronism is in order, --.

Signed and sealed this 21st day of April 1970.

(SEAL)

Attest:

Edward M. Fletcher, Jr.

Attesting Officer

WILLIAM E. SCHUYLER, JR.

Commissioner of Patents